United States Patent
Mas Haris

(10) Patent No.: US 6,743,866 B2
(45) Date of Patent: Jun. 1, 2004

(54) RUBBER DERIVATIVES AND METHOD FOR THEIR PREPARATION

(75) Inventor: Mas Rosemal Hakim b Mas Haris, Penang (MY)

(73) Assignee: Universiti Sains Malaysia, Penang (MY)

( * ) Notice: Subject to any disclaimer, the term of this patent is extended or adjusted under 35 U.S.C. 154(b) by 127 days.

(21) Appl. No.: 10/004,861

(22) Filed: Dec. 7, 2001

(65) Prior Publication Data

US 2002/0072558 A1 Jun. 13, 2002

(30) Foreign Application Priority Data

Dec. 8, 2000 (MY) ........................... PI 20005763

(51) Int. Cl.$^7$ .................................. C08F 8/04
(52) U.S. Cl. .................. 525/339; 524/430; 525/331.9; 525/332.8
(58) Field of Search .................. 525/339, 332.8, 525/331.9; 524/430

(56) References Cited

U.S. PATENT DOCUMENTS

| | | | | |
|---|---|---|---|---|
| RE26,433 E | * | 8/1968 | Le Suer | 252/33.6 |
| 5,717,039 A | * | 2/1998 | Cusumano et al. | 525/340 |
| 5,728,767 A | * | 3/1998 | Kanetou et al. | 524/504 |
| 5,877,389 A | * | 3/1999 | Sorokin et al. | 588/205 |
| 6,503,359 B2 | * | 1/2003 | Virtanen | 156/310 |

* cited by examiner

Primary Examiner—David W. Wu
Assistant Examiner—Henry S Hu
(74) Attorney, Agent, or Firm—Lowe Hauptman Gilman & Berner LLP

(57) ABSTRACT

A rubber derivative comprises a coordination compound of a natural or synthetic rubber containing double bonds and/or epoxy or other groups containing an electronegative atom or atoms and preferably having a weight average molecular weight of from 20,000 to 90,000, more preferably, 20,000 to 85,000, especially about 80,000, with an alkali or alkaline earth metal. The derivatives may be made by dissolving a rubber containing double bonds and/or epoxy or other groups containing an electronegative atom or atoms and having at least a component with a weight average molecular weight in the range of from 20,000 to 90,000, more preferably, 20,000 to 85,000, especially about 80,000, in a polar solvent, adding to the solution an at least equivalent amount of powdered alkali metal and/or alkaline earth metal hydroxide and/or carbonate, optionally together with a desiccant, if the solvent is not water-free, stirring the mixture until a coordination compound between the rubber and the metal atoms had formed and separating the coordination compound from the solvent.

24 Claims, No Drawings

RUBBER DERIVATIVES AND METHOD FOR THEIR PREPARATION

SPECIFICATION

This invention relates to rubber derivatives, More particularly, the invention provides hydrophilic rubber derivatives that are wholly or partially soluble in water or will form very stable aqueous emulsions or colloidal solutions.

BACKGROUND TO THE INVENTION

Many different natural and synthetic rubber derivatives are known.

For example, rubbers containing double bonds have been epoxidised to provide derivatives with active sites that can be utilized to introduce various other molecules to provide rubbers with desired modified properties.

Numerous attempts have been made to produce water-soluble rubber derivatives, which would be useful for a wide variety of purposes but to date all that has been achieved is derivatives that can be used to form aqueous suspensions of limited stability and from which the derivative settles out after a short period.

SUMMARY OF THE INVENTION

According to the invention, a rubber derivative comprises a coordination compound of a natural or synthetic rubber containing double bonds and/or epoxy or other groups containing an electronegative atom or atoms and preferably having a weight average molecular weight of from 20,000 to 90,000, more preferably, 20,000 to 85,000, especially about 80,000, with an alkali or alkaline earth metal.

Typical of the rubbers that can be used to form the coordination compound derivatives of the invention are natural rubber (cis-polyisoprene), preferably liquid natural rubber, trans-polyisoprene, neoprene, nitrile rubber, polybutadienes and epoxidised rubbers, especially liquid epoxidised polyisoprenes or blends of such rubbers.

Although the coordination compounds of the invention are preferably formed using rubbers of relatively low average molecular weight, the compounds will also form in the presence of larger rubber molecules so it is possible to form the coordination compounds from the lower molecular weight component of any rubber but at lower yield.

The metal component of the coordination compound is preferably an alkali metal, more preferably potassium or sodium, but alkaline earth metals, preferably calcium, can also be used to form coordination compounds. Mixtures of metals, for example of potassium and sodium or lithium or potassium and calcium can also be used.

Since, in order that strong intra-coordinated bonds are formed, the rubber molecules must wrap round the metal atoms so that bonds can form at a plurality of sites, the size of the metal atoms must be taken into consideration. If they are too small the rubber molecules may not be sufficiently flexible to wrap closely around the metal atom so that the active sites on the rubber molecules will be too far from the metal atoms for a number of bonds to form and if they are too big the metal atoms may not be able to enter the spaces available in the rubber molecules However it is believed that both intra- and inter-coordinated bonds are formed and that inter coordinated bonds may be formed between the rubber and larger or smaller metal atoms.

The rubber derivatives of the invention are hydrophilic and can be dissolved in water to form clear, brownish solutions. Where the derivatives are made from rubbers with higher molecular weight components, any coordination compounds formed from such components may not be wholly water soluble but the derivatives will still form suspensions of the insoluble portion in a solution of the soluble portion that remain stable for a number of years.

The derivatives of the invention may be made by dissolving a rubber containing double bonds and/or epoxy or other groups containing an electronegative atom or atoms and having at least a component with a weight average molecular weight in the range of from 20,000 to 90,000, more preferably, 20,000 to 85,000, especially about 80,000, in a polar solvent, adding to the solution an at least equivalent amount of powdered alkali metal and/or alkaline earth metal hydroxide and/or carbonate, optionally together with a desiccant, if the solvent is not water-free, stirring the mixture until a coordination compound between the rubber and the metal atoms has formed and separating the coordination compound from the solvent.

The polar solvent is preferably 1,4-dioxane or tetrahydrofuran.

The mixture of rubber solution and metal is preferably heated under reflux with continuous stirring, preferably for a period of from three to twenty four hours. The solution is preferably evaporated to dryness and then the residue is further dried under vacuum.

When a rubber having a high average molecular weight is to be used in the preparation of the derivatives, prior to addition of the base, the rubber is preferably heated under reflux in a polar solvent for sufficient time to break at least some of the molecular chains to reduce the molecular weight, whereby the yield of derivative will be increased.

The residue can then be taken up in water and, provided that the pH of the solution or suspension remains above 7, the solution or suspension is stable indefinitely. However, when the solution or suspension is acidified, for example by the addition of dilute hydrochloric or other acid, the coordinated bonds break and the rubber is precipitated.

This surprising phenomenon gives rise to some very special uses of the rubber derivatives of the invention in that they can be used very effectively as water treatment agents.

If even a small amount of a dilute solution or suspension is added to water containing suspended or dispersed pollutants and then acid is added the precipitated rubber gathers up the pollutant and forms an easily separable matrix containing the pollutant. If the density of the pollutant is lower than that of water the precipated rubber carries the pollutant with it to the surface of the water where it can be readily separated from the water, for example, by skimming.

Thus, the derivatives can be used for cleaning water containing very fine, unfilterable particulate material, such as smoke residue, carbon or wood dust, or finely dispersed liquid material, such as oil droplets, in a very simple and cost effective manner.

The derivatives can be used alone or together with conventional flocculants or coagulants, for example, salts or oligomeric or polymeric materials, such as chitin or chitosan and various acrylic polymers.

Moreover, the derivatives can be used to extract or remove ions, particularly metal ions, such as, for example, copper, nickel, iron, tin, platinum, gold, chromium, mercury and lead, from water or to clear water from pungent odours or undesired pigmentation. The derivatives can be used either as the sole treatment agent or in conjunction with another ion removing material, by adding to the water the ion removing material for example activated charcoal or an ion exchange resin or a zeolite or chitin or chitosan, to trap the ions and then adding the derivative and acidifying. Minute particles of the ion removing material that would otherwise be difficult to remove after a conventional treatment can therefore be easily removed. In this application, the derivatives may be used to reclaim useful metals from water.

The derivatives can also be used to produce water-based rubberized adhesives, paints and coatings, which has never previously been possible.

They may also be used as a slow-release binding matrix for fertilisers and pesticides. To produce such products, the active principle is dissolved or suspended in water, the derivative solution is added followed by acid and the rubber matrix containing the active principle which forms is collected. Fertilisers and pesticides in this form have the advantage that they are not washed away so readily in a heavy downpour.

DESCRIPTION OF PREFERRED EMBODIMENTS

The following examples illustrate the invention:

EXAMPLE 1

20 grams of epoxidised liquid natural rubber having an epoxy content of 50% (ENR 50) was dissolved in 1 litre of dry 1,4-dioxane and 30 grams of powdered potassium hydroxide was added to the solution. The mixture was heated under reflux for twelve hours. During the heating the colour of the solution changed from a light yellowish-brown and took on a reddish tinge, indicating the formation of a coordination compound between the rubber and the potassium. At the end of the heating period the reaction mixture was filtered or decanted to remove unused potassium hydroxide, the solvent was evaporated using a rotary evaporator. The resulting residue was further dried under vacuum for a further two hours. The yield was quantitative based on the rubber.

The residue was found to be readily soluble in water to form a clear brownish solution that retained its appearance for more than two years.

The residue was dissolved in 1 litre of water and 1–2 mls of this solution was added to about 50 mls of water containing about 5 gms of activated charcoal or carbon dust and agitated for 10–20 seconds. The mixture was then acidified with hydrochloric acid whereupon the rubber precipitated and rose to the surface carrying the dust with it. Any other material absorbed on or in the dust was also trapped in the precipitated rubber matrix.

The removal of the carbon dust was practically quantitative.

EXAMPLE 2

The same procedure as in Example 1 was followed but using epoxidised liquid natural rubber having an epoxy content of 25% (ENR 25) with similar results.

The properties of the derivative in removing carbon dust from water were the same.

EXAMPLE 3

The same procedure as in Example 1 was followed but using liquid natural rubber of weight average molecular weight about 80,000 with similar results.

The properties of the derivative in removing carbon dust from water were the same.

EXAMPLE 4

The same procedure as in Example 3 was used with a liquid natural rubber having a weight average molecular weight of 140,000. The derivative was not totally water-soluble but formed a milky very stable suspension. It could, however be used to remove carbon dust from water with equivalent results.

What is claimed is:

1. A rubber complex comprising a coordination compound of a natural or synthetic rubber comprising double bonds or epoxy groups or both with an alkali metal or an alkaline earth metal.

2. The rubber complex of claim 1, wherein the rubber has a number average molecular weight from 5,000 to 15,000.

3. The rubber complex of claim 1, wherein the rubber has a weight average molecular weight from 20,000 to 90,000.

4. The rubber complex of claim 2, wherein the rubber has a number average molecular weight of about 10,000.

5. The rubber complex of claim 3, wherein the rubber has a weight average molecular weight of about 85,000.

6. The rubber complex of claim 1, which comprises a synthetic rubber comprising trans-poly isoprene, neoprene, nitrile rubber, polybutadiene or an epoxidised rubber.

7. The rubber complex of claim 1, which comprises a natural rubber.

8. The rubber complex of claim 7, wherein the natural rubber is a liquid.

9. The rubber complex of claim 1, which comprises an alkali metal.

10. The rubber complex of claim 9, wherein the alkali metal is potassium.

11. The rubber complex of claim 1, which comprises an epoxidised liquid natural rubber having an epoxy content of 25–50% (ENR 25–50).

12. The rubber complex of claim 1, which comprises an alkaline earth metal.

13. The rubber complex of claim 12, wherein the alkaline earth metal is calcium.

14. The rubber complex of claim 1, which is in a polar solvent at a pH above 7.

15. The rubber complex of claim 14, wherein said polar solvent is 1,4-dioxane.

16. The rubber complex of claim 14, wherein said polar solvent is tetrahydrofuran.

17. A method of making the rubber complex of claim 1, which comprises the steps of:
   a) dissolving a natural or synthetic rubber comprising double bonds or epoxy groups or both in a polar solvent to form a solution or emulsion;
   b) adding to the solution or emulsion at least an equivalent amount of powdered alkali metal hydroxide, alkali metal carbonate, alkaline earth metal hydroxide or alkaline earth metal carbonate or a mixture thereof, optionally with a desiccant when said solution or emulsion is not free of water;
   c) stirring a resulting mixture from step b) until a coordination complex forms between the rubber and alkali metal or alkaline earth metal ions or both; and
   d) separating the rubber complex from the solvent.

18. The method of claim 17, wherein in step a), the polar solvent is selected from the group consisting of 1,4-dioxane and tetrahydrofuran.

19. The method of claim 17, wherein in step b), an alkali metal hydroxide is used, which is potassium hydroxide.

20. The method of claim 17, which further comprises after step a), and before step b), heating said natural or synthetic rubber in said polar solvent for a time sufficient to break at least a portion of molecular chains of said rubber to reduce molecular weight of the rubber.

21. A method of treating water to remove pollutants therefrom or to reclaim materials in said water, which comprises the steps of:
   a) adding the rubber complex of claim 1, to said water at a pH above 7 to form a mixture;
   b) agitating said mixture; and
   c) acidifying said mixture to a pH of less than 7, thereby separating the rubber complex from the pollutants to be removed or the materials to be reclaimed.

22. The method of claim 21, which comprises removing pollutants from the water.

23. The method of claim 21, which comprises reclaiming materials from the water.

24. The method of claim 23, wherein said materials reclaimed comprises metal ions from the water:
   a) adding the rubber complex of claim 1, to said water at a pH above 7 to form a mixture;
   b) agitating said mixture; and
   c) acidifying said mixture to a pH of less than 7, thereby separating the rubber complex from the pollutants to be removed or the materials to be reclaimed.

* * * * *